United States Patent Office 2,940,573
Patented June 14, 1960

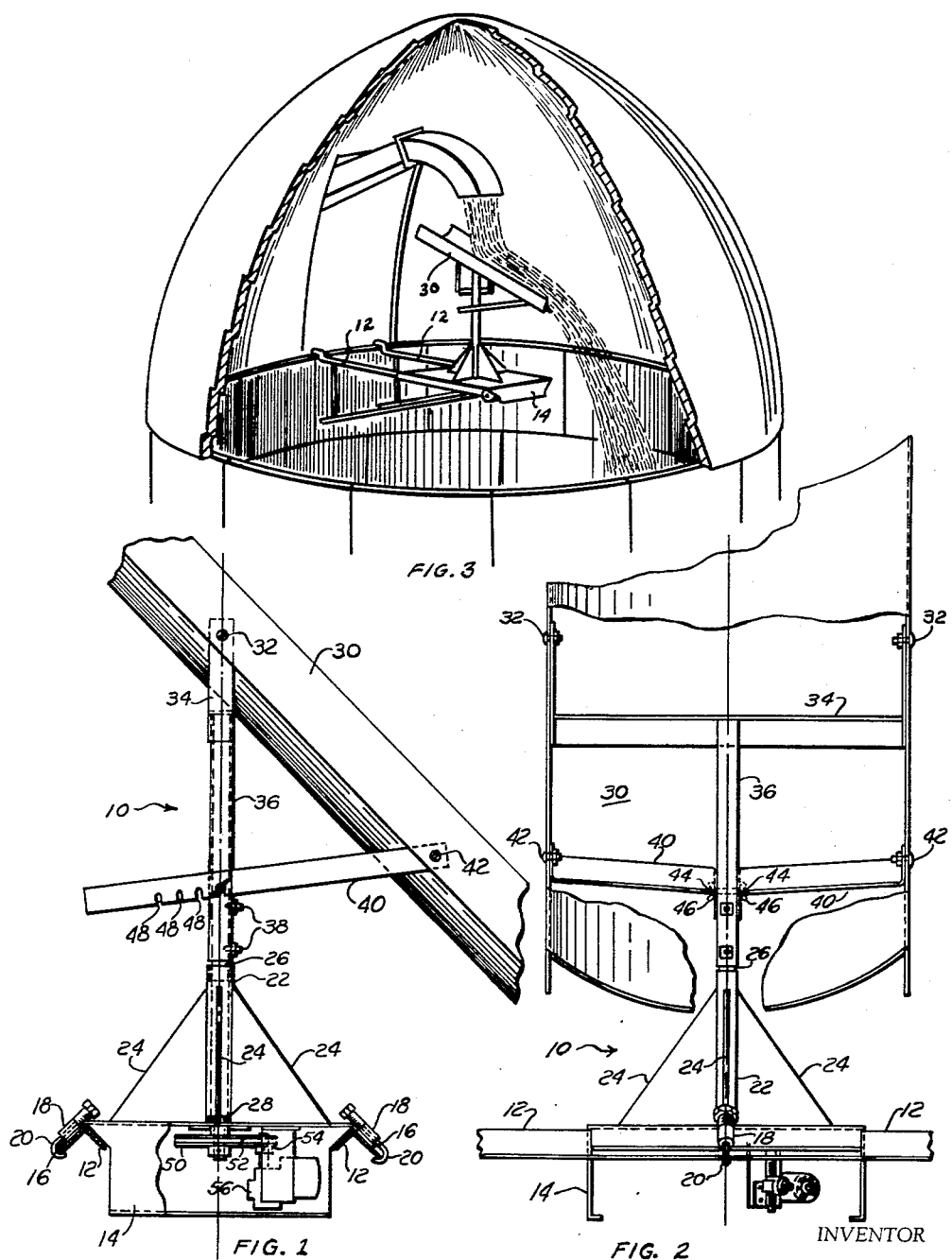

2,940,573

SILAGE DISTRIBUTOR

Leonard R. Schultz, R.F.D. 1, Albion, Mich.

Filed Aug. 8, 1957, Ser. No. 677,152

3 Claims. (Cl. 193—3)

The invention relates to a silage distributor and particularly to a motor driven silage distributor capable of evenly distributing silage in a silo or like storage container.

Silage blown into a silo or other storage container tends to accumulate unevenly, thus to obtain maximum efficiency of the storage space and proper packing the silage must be distributed within the silo. The usual means of distribution is manual, by a man with a fork within the silo. However, this method is inefficient, hazardous, tedious and expensive. It is, thus, an object of the invention to provide a mechanical silage distributor which will efficiently distribute silage within a storage container eliminating the need of manual distribution.

Another object of the invention is to provide a silage distributor which will distribute in a 360° periphery and is self-powered.

Yet a further object of the invention is to design a silage distributor which is economical to manufacture, motor driven and may be readily adjusted to various sizes of silos.

These and other objects of the invention will become apparent when the subject matter is viewed with regard to the following description and accompanying drawings wherein:

Fig. 1 is an elevational view, partly in section, of an embodiment of the invention;

Fig. 2 is an elevational view of the invention taken from the left of Fig. 1, and Fig. 3 is a view of the silage distributor mounted in a silo.

The silage distributor of the invention may assume the embodiment of Fig. 1 wherein the distributor 10 may be positioned and supported by a pair of spaced parallel bars 12 of right angle cross section. The bars 12 are in turn supported over the container to be filled with silage, in most cases a silo, the bars 12 being temporarily or permanently anchored to the top of the silo and extending diametrically across whereby the distributor 10 may be located above the center of the silo.

The components of the silage distributor 10 are mounted upon an inverted channel shaped base 14 provided with the overlapping guides 16 which contact and cooperate with the bars 12. Eyes 18 are welded centrally on guides 16 providing support for the threaded U-hooks 20 which project under the guides 16 and may be drawn up to securely locked the base 14 on the bars 12. A pivot sleeve 22 rises from the center of base 14 and is supported in perpendicular relation thereto by four webs 24. A shaft 26 is rotatably journaled within sleeve 22 and extends some distance above the end of the sleeve. A thrust bearing 28 within sleeve 22 supports the weight of shaft 26.

A concave chute 30 is supported on the shaft 26 by a yoke and standard assembly. As best shown in Fig. 2, the upper portion of chute 30 is pivotally connected at 32 to the yoke 34 which is affixed to the end of the tubular standard 36. Standard 36 slips over the end of shaft 26 and is fastened thereto by a pair of set screws 38. The angular position of chute 30 is adjusted and determined by the L-shaped lower support arms 40 which are pivotally connected to the chute 30 at 42 and adjustably attached to the standard 36 by the threaded studs 44 and wing nuts 46 which project from the standard. A series of slots 48 are formed in the arms 40 which coact with the studs 44 permitting the chute to selectively assume any of several angular positions. The angular position of chute 30 is determined by the size of the silo being filled, e.g. the larger the silo in diameter the further the lower end of chute 30 is positioned from the standard 36.

To evenly distribute the silage about the entire inner periphery of the silo the chute 30 is rotated by positive drive means. Preferably the drive means consists of a pulley 50 keyed to the lower end of shaft 26 which is rotated by means of belt 52 and pulley 54. As will be observed a motor and gear reduction unit 56 is affixed to the underside of base 14 drivingly supporting pulley 54. Thus, the motor unit 56 may be energized to rotate the shaft 26 and consequently the chute 30.

It will be understood that the motor unit 56 may be of either gasoline or electric character, and as the motor unit is mounted on the underside of base 14 ample protection from the silage being blown into the silo is provided. The rate of rotation of chute 30 will depend on the size of the pulleys and r.p.m. of motor 56 and experiments have shown that about 10 r.p.m. of the shaft 26 produces good distribution of the silage.

During the operation of filling a silo, or like storage container, the distributor 10 will be located on the bars 12 above and centrally in relation to the silo. The outlet of a conventional silo loader blower and mulcher is positioned to discharge the silage onto the upper portion of chute 30 and upon energization of motor unit 56 the chute will begin to rotate distributing silage introduced into the chute about the entire silo. The slot 48 which permits the silage to be best distributed in a given size silo may be determined by experiment and the need for other packing or distributing means is completely eliminated. Thus, silage may be continuously blown into the silo until the maximum capacity is reached without delays caused by inserting outlet doors or failure of manual distribution to maintain pace with the blower.

It will, thus, be apparent that the invention describes a simple, economical, efficient silage distributor which does away with the need for a man in a silo and packs the silage effectively, the motor driven chute insuring equal distribution throughout the entire container insuring proper packing conducive to long storage periods with a minimum of spoilage.

I claim:

1. A silage distributor adapted to be located above a storage area upon spaced supporting members, a base member adjustably positioned upon said supporting members, a tubular pivot sleeve fixed to and rising vertically from said base member, a shaft rotatably journaled in said sleeve extending vertically above thereof and having a portion extending below said sleeve through said base member, thrust bearing means interposed between said shaft and said sleeve, a tubular standard inserted over the shaft on the portion thereof above the sleeve, means axially positioning said standard relative to said shaft, a yoke affixed to the upper end of said standard, a chute pivotally supported upon said yoke, support arms pivotally affixed to said chute remote from said yoke and attached to said standard to maintain said chute at the desired inclination, driven means affixed to said shaft below said base member and a motor means affixed to the underside of said base member operatively associated with said driven means to rotate said shaft, standard and chute.

2. In a silage distributor as in claim 1 wherein spaced adjustment means are located upon said support arms for selective cooperation with locking means mounted upon said standard whereby the angle of inclination of said chute may be varied.

3. In a silage distributor as in claim 1 wherein said driven means affixed to said shaft consists of a pulley and said motor means comprises an electric motor belted to said pulley.

References Cited in the file of this patent

UNITED STATES PATENTS

| | | |
|---|---|---|
| 877,304 | Dick | Jan. 21, 1908 |
| 1,524,334 | Brown | Jan. 27, 1925 |
| 2,215,736 | Jones | Sept. 24, 1940 |
| 2,788,115 | Friedman | Apr. 9, 1957 |